United States Patent Office 3,027,407
Patented Mar. 27, 1962

3,027,407
PHENOXYACETAMIDES
Randolph T. Major, Charlottesville, Va., and Karl Werner Ohly, Krummer Weg, Germany; said Major assignor to University of Virginia, and said Ohly assignor to Cobb Chemical Laboratories, University of Virginia, Charlottesville, Va.
No Drawing. Filed May 26, 1960, Ser. No. 31,801
7 Claims. (Cl. 260—559)

This invention is concerned with phenoxyacetamides and in particular with phenoxyacetamides wherein the amide nitrogen is a tertiary nitrogen having attached thereto an alkyl and an alkoxy radical.

The phenoxyacetamides of this invention can be illustrated by the following structural formula:

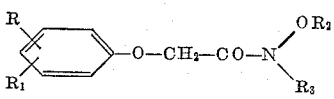

wherein the variable radical R can be attached to the ortho-, meta-, or para-position of the benzene ring and represents hydrogen or a lower aliphatic hydrocarbon radical, preferably a lower aliphatic hydrocarbon radical having 3 carbon atoms and which is either saturated or unsaturated and is either a straight or branched chain radical for example the propyl, isopropyl and allyl radicals; $R_1$ can be attached to a position other than that occupied by the radical R and can be located in ortho-, meta-, or para-position and represents hydrogen, a lower alkyl radical, preferably the methyl radical or a lower alkoxy radical, preferably the methoxy radical; $R_2$ and $R_3$ each represents a lower alkyl radical, preferably the methyl or ethyl radical.

The novel compounds of this invention possess ultra short acting anesthetic properties particularly when administered intravenously. The compounds can be administered as a 2% solution in 25% sodium benzoate or can be dissolved in propyleneglycol. Satisfactory response can be achieved when the compounds are administered at a dosage of between about 3 to 5 mg./kg. of body weight at a rate of about 5 mg./sec. The dosage, of course, will vary allowing for the effect of age, general condition of health, and similar conditions which can exert a certain influence on the dosage. The short acting anesthetic compounds of this invention are particularly well suited for use in veterinary practice, for example in small animal practice, or in clinical practice. Because of the short duration of anesthesia produced, the compounds find special application when minor surgery is to be performed such as in lancing abscess, making small incisions, tooth extractions, electrocautery, fingernail removal, and the like, or when minor procedures are indicated, such as the removal of sutures, changing of dressing or plaster of Paris casts and the like.

The compounds of this invention can be prepared by reacting a phenoxyacetyl chloride with an O,N-dialkyl-hydroxylamine. Reaction is advantageously carried out in an inert anhydrous solvent such as in the presence of ether, dioxane, tetrahydrofuran, benzene or other inert organic solvents. The reaction takes place either upon standing at room temperature or, if desired, the reaction mixture can be warmed up to reflux in order to bring the reaction to completion in a shorter period of time. The phenoxyacetamides are colorless oils of high boiling point.

When the phenoxyacetyl chloride compound itself is not readily available commercially, it can be prepared from the corresponding phenoxyacetic acid which in turn, if necessary, can be prepared from the required phenol.

If it is necessary to employ the phenol as starting material it can be converted to the phenoxyacetic acid by reacting the phenol with a haloacetic acid in the presence of alkali and advantageously in an aqueous medium to which can be added an organic solvent if desired. The reaction medium can be made alkaline with any of the common agents such as potassium or sodium hydroxide and the like and the end product, the phenoxyacetic acid can readily be precipitated by the addition of acid. For all practical purposes, chloroacetic acid is employed in preparing the phenoxyacetic acids although other haloacetic acids such as bromoacetic acid, could be used as well.

The phenoxyacetic acids then can be transformed into their acid chloride by treatment with a chlorinating agent such as thionyl chloride, phosphorus pentachloride, and the like. The phenoxyacetyl chloride thus obtained can be purified by redistillation to yield colorless to yellow liquids.

The preparation of the novel compounds of this invention is more particularly described in the following examples.

EXAMPLE 1

N-Methoxy-N-Methyl-Phenoxyacetamide

Step 1.—Phenoxyacetic acid (76.07 g., 1.9 mole) is refluxed with 60 cc. thionyl chloride for 1 hour. The excess thionyl chloride is distilled off and the oily residue then is distilled yielding 80 grams of phenoxyacetyl chloride in the form of a colorless liquid, B.P. 117° C. at 14 mm. pressure (reported B.P., 160–170° C. at 60 mm. pressure).

Step 2.—The phenoxyacetyl chloride obtained as described above (17.1 g., 0.10 mole) in 50 cc. of absolute ether is added dropwise into 16.0 g. (0.26 mole) of N-methoxy-N-methylamine dissolved in 50 cc. of absolute ether. The reaction is carried out in a 1 liter, round bottomed, 3-necked flask, equipped with a reflux condenser, drying tube, stirrer and dropping funnel, the addition of the acid chloride taking place over a period of about 20 minutes while vigorously stirring the solution. Upon completion of the addition, the reaction mixture is set aside over night whereupon it is filtered and the filtrate then placed in a separatory funnel. After repeated washings with water, the ether solution is dried over sodium sulfate and the ether then removed by evaporation yielding 17.5 g. (93.2%) of N-methoxy-N-methyl-phenoxyacetamide as a colorless viscous oil, boiling point 125° C. at 0.1 mm. pressure.

Analysis.—Calculated for $C_{10}H_{13}NO_3$: C, 61.52; H, 6.71; N, 7.18. Found: C, 61.18; H, 6.77.

EXAMPLE 2

N-Ethoxy-N-Ethyl-Phenoxyacetamide

Phenoxyacetyl chloride (17.1 g., 0.1 mole) in 100 cc. of absolute ether is added dropwise with stirring to 8.9 g. (0.1 mole) of N-ethoxy-N-ethylamine in 100 cc. of ether. As the reaction mixture showed an acidic reaction, it was thoroughly washed with water and dried. Thereafter the reaction was carried out as described in Example 1, step 2, to yield N-ethoxy-N-ethyl-phenoxyacetamide which, after three purifications carried out by dissolving the product in benzene and filtering through an alumina column gave 19.5 g. (87.5%) of product, B.P. 138° C. at 0.05 mm. pressure.

Analysis.—Calculated for $C_{12}H_{17}NO_3$: C, 64.55; H, 7.68; N, 6.27. Found: C, 64.22; H, 7.63.

EXAMPLE 3

N-Methoxy-N-Methyl-Thymoxyacetamide

Step 1.—Thymol (3-methyl-6-isopropylphenol, 100 g., 0.75 mole) is added to a solution of 60 g. (1.5 mole) of sodium hydroxide and 71 g. (0.75 mole) of monochloroacetic acid in 600 cc. of water. After 6 hours in a steam-bath, the upper layer of unreacted thymol is extracted with ether (45 g.). Acidification of the aqueous phase gives an oily precipitate which readily crystallizes yielding 88 g. (55%) of thymoxyacetic acid. Upon twice recrystallizing from a mixture of alcohol and water, the product melts at 149–150° C. (reported, 145° C.).

Thymoxyacetic acid was prepared by an alternate procedure as follows:

*Step 1A.*—Sodium hydroxide (16 g., 0.4 mole) is dissolved in a minimum of water and the solution then is diluted with 50 cc. alcohol. Thymol (30 g., 0.2 mole) is added and then 19 g. (0.2 mole) of monochloroacetic acid. The mixture becomes hot and is refluxed for 10 hours, then poured into water and 20 cc. concentrated hydrochloric acid added yielding 30 g. (72%) of thymoxyacetic acid.

*Step 2.*—Crude, but dry, thymoxyacetic acid is refluxed with 75 g. (1.6 mole) of thionyl chloride for 30 minutes. After evaporation of the excess thionyl chloride, the residual oily material is distilled yielding thymoxyacetyl chloride as a colorless oil, B.P. 148° C. at 14 mm. pressure.

The product crystallizes and then can be recrystallized from petroleum ether to give 62 grams of product, M.P. 57–59° C.

*Step 3.*—Thymoxyacetyl chloride (11.34 g., 0.05 mole) in 50 cc. of absolute ether is added to and reacted with 10 g., (0.16 mole) of N-methoxy-N-methylamine in 50 cc. of absolute ether as described in Example 1, step 2. The product obtained is purified by filtering through an alumina column yielding 5.7 g. (46.2%) of N-methoxy-N-methyl-thymoxyacetamide as a colorless viscous oil, B.P. 156° C. at 0.08 mm. pressure.

*Analysis.*—Calculated for $C_{14}H_{21}NO_3$: C, 66.90; H, 8.42; N, 5.57. Found: C, 66.59; H, 8.16.

EXAMPLE 4

N-Ethoxy-N-Ethyl-Thymoxyacetamide

Thymoxyacetyl chloride (20 g., 0.08 mole, prepared as described in Example 3, steps 1 and 2) in 150 cc. absolute ether is added to and reacted with 18 g. (0.20 mole) of N-ethyl-N-ethoxyamine dissolved in 150 cc. absolute ether by substantially the same method described in Example 1, step 2, yielding 23 g. (82.4%) of N-ethoxy-N-ethyl-thymoxyacetamide as a yellow oil, B.P. 157° C. at 0.2 mm. pressure. The product was further purified by filtering through an alumina column as described in Example 1, step 2, and then redistilled yielding 18 g. of an almost colorless, viscous oil which boiled at 154–156° C. at 0.6 mm. pressure.

*Analysis.*—Calculated for $C_{16}H_{25}NO_3$: C, 68.79, H, 9.02, N, 5.01; Found: C, 68.62, H, 8.89.

EXAMPLE 5

N-Methoxy-N-Methyl-2-Methyl-5-Isopropylphenoxy-acetamide

*Step 1.*—By replacing the thymol employed in Example 3, step 1, by an equimolecular quantity of 2-methyl-5-isopropylphenol and following substantially the same procedure described in Example 3, step 1, there is obtained 2-methyl-5-isopropylphenoxy-acetic acid in 53.2% yield.

This product was also prepared in somewhat better yield by replacing the thymol employed in Example 3, step 1A by an equivalent quantity of 2-methyl-5-isopropylphenol and following substantially the same procedure described in Example 3, step 1B yielding 73.3% of 2-methyl-5-isopropylphenoxyacetic acid.

*Step 2.*—2-methyl-5-isopropylphenoxyacetic acid (111 g., 0.74 mole) is refluxed 40 minutes with 78 g. (1 mole) of thionyl chloride. After removal of excess thionyl chloride by distillation, the residue is distilled two times yielding 83 g. (49.5%) of 2-methyl-5-isopropylphenoxy-acetyl chloride, as a clear reddish oil, B.P. 150° C. at 14 mm. pressure.

*Step 3.*—2 - methyl-5-isopropylphenoxyacetyl chloride (12 g., 0.053 mole) in 50 cc. absolute ether is added dropwise with stirring to 10 g. (0.16 mole) of N-methyl-n-methoxyamine dissolved in 50 cc. absolute ether. The reaction was carried out and the end product isolated as described in Example 1, step 2, and then twice purified over alumina as described in Example 1, step 2, to yield N - methoxy-N-methyl-2-methyl-5-isopropylphenoxy-acetamide as a slightly yellowish, viscous oil, boiling point 139–145° C. at 0.3 mm. pressure.

*Analysis.*—Calculated for $C_{14}H_{21}NO_3$ C, 66.90; H, 8.42; N, 5.57. Found: C, 66.61; H, 8.52.

EXAMPLE 6

N-Ethoxy-N-Ethyl-2-Methyl-5-Isopropylphenoxy-acetamide 2-methyl-5-isopropylphenoxyacetyl chloride (11.34 g., 0.05 mole, prepared as described in Example 5, steps 1 and 2), is dissolved in 100 cc. of absolute ether and added to 8.9 g. (0.1 mole) of N-ethyl-N-ethoxyamine as described in Example 1, step 2. The reaction was carried out and the end product isolated and purified over alumina as described in Example 1, step 2, yielding N-ethoxy-N-ethyl-2-methyl-5-isopropylphenoxyacetamide as a slightly yellowish, viscous oil which, after redistillation, has a B.P. of 144° C. at 0.1 mm. pressure.

*Analysis.*—Calculated for $C_{16}H_{25}NO_3$: C, 68.78; H, 9.02; N, 5.01. Found: C, 68.31; H, 8.92; N, 5.20.

EXAMPLE 7

N-Methoxy-N-Methyl-2-Methoxy-4-Allylphenoxy-acetamide

*Step 1.*—By replacing the thymol employed in Example 3, step 1, by an equivalent quantity of 2-methoxy-4-allylphenol and following substantially the same procedure described in Example 3, steps 1 and 2, there is obtained 2-methoxy-4-allylphenoxyacetyl chloride.

*Step 2.*—2-methoxy-4-allylphenoxyacetyl chlorine (12 g. 0.05 mole) in 100 cc. absolute ether is added to and reacted with 6.1 g. (0.1 mole) of N-methyl-N- methoxy-amine and then purified by filtering through an alumina column by substantially the same procedure described in Example 1, step B, giving practically 100% yield of N - methoxy - N - methyl-2-methoxy-4-allylphenoxyacetamide in the form of a colorless, viscous oil, B.P. 170° C. at 0.005 mm. pressure.

*Analysis.*—Calculated for $C_{14}H_{19}NO_4$: C, 63.38; H, 7.22; N, 5.28. Found: C, 63.05; H, 7.16; N. 5.42.

EXAMPLE 8

N-Ethoxy-N-Ethyl-2-Methoxy-4-Allylphenoxyacetamide 2-methoxy-4-allylphenoxyacetyl chloride (42 g., 0.18 mole, prepared as described in Example 7, step 1), in 150 cc. of absolute ether is added to and reacted with 32 g. (0.36 mole) of N-ethyl-N-ethoxyamine in 150 cc. absolute ether and then purified by filtering through an alumina column by substantially the same method described in Example 1, step 2, yielding 56 g. (94%) of N-ethoxy-N-ethyl-2-methoxy-4-allylphenoxyacetamide in the form of a colorless, viscous oil, B.P. 161° C. at 0.08 mm. pressure.

*Analysis.*—Calculated for $C_{16}H_{23}NO_4$: C, 65.50; H, 7.90; N, 4. Found: C, 64.99; H, 7.79.

EXAMPLE 9

N-Methoxy-N-Methyl-2-Methoxy-4-n-Propylphenoxyacetamide

*Step 1.*—The known 2-methoxy-4-n-propylphenol is prepared from eugenol (2-methoxy-4-allylphenol) by hydrogenating it in the presence of 10% palladium on charcoal in methanol to give a quantitative yield of product, B.P. 115° C. at 0.001 mm. pressure. The reduction is complete within a few minutes.

*Step 2.*—2-methoxy-4-n-propylphenol (83.1 g., 0.5 mole) is dissolved in a solution of 40 g. (1 mole) of sodium hydroxide in 100 cc. water. Monochloroacetic acid (47.5 g.,1 mole) is added and heat was evolved over a period of 30 minutes. The reaction mixture then was refluxed for 10 hours, poured into ice and upon addition of 50 cc. of hydrochloric acid an oil appeared, which crystallizes at once, yielding 111 g. (99%) of 2-methoxy-4-n-propylphenoxyacetic acid. After recrystallization from alcohol, the product in the form of needles melted at 78° C.

*Step 3.*—2-methoxy-4-n-propylphenoxyacetic acid (93.5 g., 0.4 mole) is refluxed for 30 minutes with excess thionyl chloride by substantially the same procedure described in Example 3, step 2, to yield 81 g. (83.4%) of 2-methoxy-4-n-propylphenoxyacetyl chloride, B.P. 133–139° C. at 1.4–1.8 mm. pressure.

*Step 4.*—The acid chloride (24.2 g., 0.1 mole) obtained as described above and 12.2 g. (0.2 mole) of N-methyl-N-methoxyamine are combined together, reacted, and the end product purified by filtering over alumina by substantially the same method described in Example 1, step 2, yielding 22 g. (82.5%) of N-methoxy-N-methyl-2-methoxy-4-n-propylphenoxyacetamide in the form of a viscous, colorless oil, B.P. 174–180° C. at 0.2–0.3 mm. pressure.

*Analysis.*—Calculated for $C_{14}H_{21}NO_4$: C, 62.90; H, 7.92; N, 5.24. Found: C, 62.67; H, 8.02; N, 5.25.

EXAMPLE 10

*N-Ethoxy-N-Ethyl-2-Methoxy-4-n-Propylacetamide*

2-methoxy-4-n-propylphenoxyacetyl chloride (24.2 g., 0.1 mole, prepared as described in Example 9, steps 1 through 3), is combined with 18 g. (0.21 mole) of N-ethyl-N-ethoxyamine and reacted and the end product purified by filtering over alumina by substantially the same procedure described in Example 1, step 2, yielding 21 g. (71.1%) of N-ethoxy-N-ethyl-2-methoxy-4-n-propylacetamide in the form of a viscous, colorless oil, B.P. 169–173° C. at 0.04 mm. pressure. After redistillation the boiling point is 165° C. at 0.3 mm. pressure.

*Analysis.*—Calculated for $C_{16}H_{25}NO_4$: C, 65.06; H, 8.53; N, 4.74. Found: C, 65.27; H, 8.88.

While the above examples describe the preparation of certain illustrative compounds illustrated by the generic structure in the introductory portion of the specification, and certain specific reaction conditions for preparing these compounds, it is to be understood that the invention is not to be limited by these examples or by the specific reaction conditions for the preparation of the compound, but is understood to embrace variations and modifications falling within the scope of the appended claims.

What is claimed is:

1. A compound of the formula

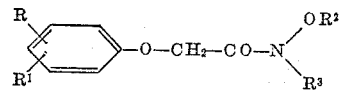

wherein R is selected from the group consisting of hydrogen, lower alkyl and lower alkenyl; $R^1$ is selected from hydrogen, lower alkyl and lower alkoxy; $R^2$ is lower alkyl; and $R^3$ is lower alkyl.

2. A compound of the formula

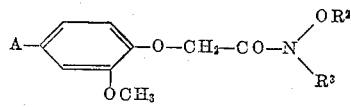

wherein A is a 3-carbon lower alkenyl; $R^2$ is lower alkyl; and $R^3$ is lower alkyl.

3. A compound of the formula

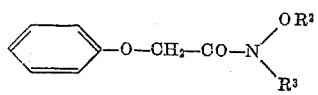

wherein $R^2$ is lower alkyl and $R^3$ is lower alkyl.

4. A compound of the formula

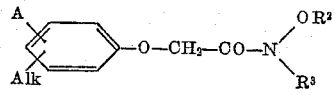

wherein A is a 3-carbon lower alkyl; Alk is lower alkyl; $R^2$ is lower alkyl; and $R^3$ is lower alkyl.

5. N-ethoxy-N-ethyl-(2-methoxy-4-allylphenoxy) acetamide.

6. A compound of the formula

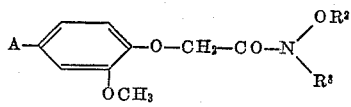

wherein A is a 3-carbon lower alkyl; $R^2$ is lower alkyl; and $R^3$ is lower alkyl.

7. N - ethoxy-N-ethyl-(2-methoxy-4-n-propylphenoxy) acetamide.

References Cited in the file of this patent

UNITED STATES PATENTS 2,911,440    Thuillier et al.    Nov. 3, 1959

FOREIGN PATENTS 201,589    Austria    Jan. 10, 1959
810,539    Great Britain    Mar. 18, 1959
335,691    Switzerland    Mar. 14, 1959

UNITED STATES PATENT OFFICE
CERTIFICATE OF CORRECTION

Patent No. 3,027,407                      March 27, 1962

Randolph T. Major et al.

It is hereby certified that error appears in the above numbered patent requiring correction and that the said Letters Patent should read as corrected below.

In the grant, lines 1 to 5, for "Randolph T. Major, of Charlottesville, Virginia, and Karl Werner Ohly, of Krummer Weg, Germany; said Major assignor to University of Virginia, and said Ohly assignor to Cobb Chemical Laboratories, University of Virginia, of Charlottesville, Virginia," read -- Randolph T. Major, of Charlottesville, Virginia, and Karl Werner Ohly, of Krummer Weg, Germany, assignors to University of Virginia, of Charlottesville, Virginia, --; lines 14 and 15, for "University of Virginia and Cobb Chemical Laboratories, University of Virginia, their successors" read -- University of Virginia, its successors --; in the heading to the printed specification, lines 3 to 7, for "Randolph T. Major, Charlottesville, Va., and Karl Werner Ohly, Krummer Weg, Germany; said Major assignor to University of Virginia, and said Ohly assignor to Cobb Chemical Laboratories, University of Virginia, Charlottesville, Va." read -- Randolph T. Major, Charlottesville, Va., and Karl Werner Ohly, Krummer Weg, Germany, assignors to University of Virginia, Charlottesville, Va. --.

Signed and sealed this 31st day of July 1962.

(SEAL)
Attest:
ERNEST W. SWIDER                                    DAVID L. LADD
Attesting Officer                                      Commissioner of Patents